J. A. ROCKWOOD.
Planter and Cultivator.
No. 97,121.            Patented Nov. 23, 1869.
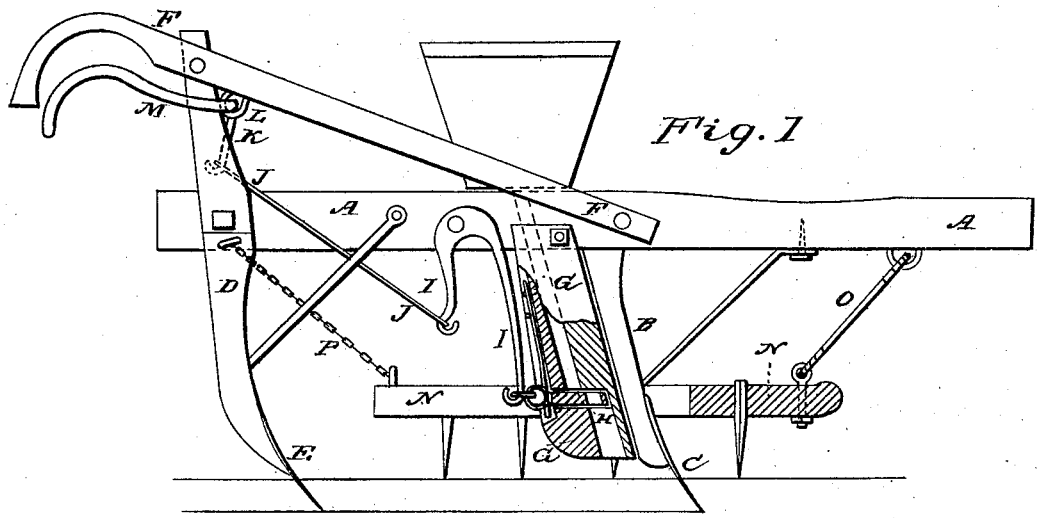
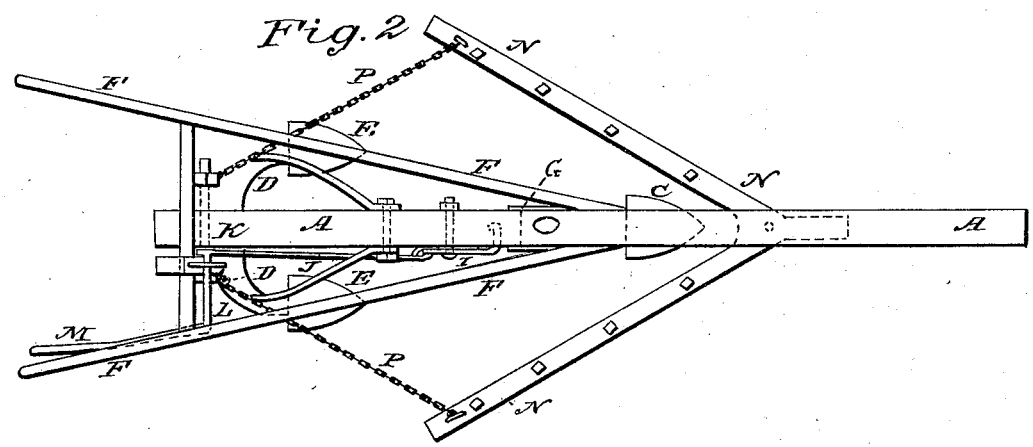
Witnesses
Geo. W. Mabee
Jno. F. Brooks
Inventor
J. A. Rockwood
her Wmn
attorneys.

United States Patent Office.

JOHN A. ROCKWOOD, OF KINDERHOOK, ILLINOIS, ASSIGNOR TO HIMSELF AND S. MORRIS, OF SAME PLACE.

Letters Patent No. 97,121, dated November 23, 1869.

IMPROVEMENT IN COMBINED PLANTER AND CULTIVATOR.

The Schedule referred to in these Letters Patent and making part of the same.

*To all whom it may concern:*

Be it known that I, JOHN A. ROCKWOOD, of Kinderhook, in the county of Pike, and State of Illinois, have invented a new and useful Improvement in Combined Planter and Cultivator; and I do hereby declare that the following is a full, clear, and exact description thereof, which will enable others skilled in the art to make and use the same, reference being had to the accompanying drawings, forming part of this specification, in which—

Figure 1 is a side view of my improved cultivator, partly in section, to show the construction.

Figure 2 is a top or plan view of the same.

Similar letters of reference indicate corresponding parts.

My invention has for its object to furnish a simple, convenient, strong, durable, effective, and cheap machine, which shall be so constructed and arranged that it may be easily and quickly adjusted for use as a planter or cultivator, as may be required; and It consists in the construction and combination of the various parts of the machine, as hereinafter more fully described.

A is the beam, to the middle part of which is attached the standard B, to the lower end of which is attached the plow C, by which the furrow is opened to receive the grain.

To the opposite sides of the rear end of the beam A are attached the rear standards D, to the lower ends of which are attached the plows E, by which the seed is covered.

F are the handles, the forward ends of which are attached to the middle part of the beam A, and the rear parts of which are connected by a cross-bar or round.

G is the dropping-spout, through which the seed passes from the hopper to the ground.

The passage through the spout G is made with an offset at the point at which the dropping-slide H enters, so that the said slide may receive enough kernels to form a hill from the upper part of said spout and convey them to the lower part of said spout, through which they drop to the ground.

To the rear end of the dropping-slide H is pivoted one end of the bent lever I, which is pivoted at its bend or angle to the beam A, and to its other end is pivoted the lower end of the connecting-rod J.

The other or upper end of the rod J is pivoted to the arm K of the shaft L, to which is attached or upon which is formed a crank, lever, or trigger, M, which extends up below the hand-piece of one of the handles F, so that it may be conveniently operated by the driver to drop the seed.

N is a triangular harrow, the forward end or angle of which is connected with the forward part of the beam A by the rod or chain O, the lower end of which is pivoted to said harrow, and the upper end of which is pivoted to the forward part of said beam A, as shown in fig. 1.

The rear angles of the harrow N are connected with the rear part of the beam A, or with the rear standards D, by the chains or rods P, as shown in figs. 1 and 2.

The harrow N may be used in connection with the furrowing-plow B C, or without said plow, according to the condition of the soil.

When the machine is to be used as a cultivator, the seed-dropping device is detached, and the forward or furrowing-plow B C replaced by one of the rear or covering-plows D E.

Having thus described my invention,

I claim as new, and desire to secure by Letters Patent—

The combination of the harrow N O P with the beam A, dropping-device G H I J K L M, handles F, and rear or covering-plows D E, whether used with or without the furrowing-plow B C, substantially as herein shown and described, and for the purpose set forth.

Witnesses:       JOHN A. ROCKWOOD.
  JOHN W. CHAMBERLAIN,
  J. S. FREDERICK.